US011255745B2

(12) United States Patent
Liu et al.

(10) Patent No.: US 11,255,745 B2
(45) Date of Patent: Feb. 22, 2022

(54) TEST DEVICE FOR SIMULATING LONGITUDINAL-LATERAL-TORSIONAL COUPLED NONLINEAR VIBRATION OF DRILL STRING OF DEEPWATER RISERLESS DRILLING AND METHOD THEREFOR

(71) Applicants: SOUTHWEST PETROLEUM UNIVERSITY, Chengdu (CN); Chengdu University of Technology, Chengdu (CN)

(72) Inventors: Jun Liu, Chengdu (CN); Xiaoqiang Guo, Chengdu (CN); Qingyou Liu, Chengdu (CN); Yufa He, Chengdu (CN); Anchao Wei, Chengdu (CN); Linlin Zeng, Chengdu (CN); Jianxun Wang, Chengdu (CN)

(73) Assignees: Southwest Petroleum University, Chengdu (CN); Chengdu University of Technology, Chengdu (CN)

( * ) Notice: Subject to any disclaimer, the term of this patent is extended or adjusted under 35 U.S.C. 154(b) by 0 days.

(21) Appl. No.: 16/982,439

(22) PCT Filed: Apr. 26, 2019

(86) PCT No.: PCT/CN2019/084457
§ 371 (c)(1),
(2) Date: Sep. 18, 2020

(87) PCT Pub. No.: WO2020/113898
PCT Pub. Date: Jun. 11, 2020

(65) Prior Publication Data
US 2021/0199535 A1    Jul. 1, 2021

(30) Foreign Application Priority Data
Dec. 5, 2018    (CN) .......................... 201811482702.2

(51) Int. Cl.
*G01M 7/02* (2006.01)

(52) U.S. Cl.
CPC ................................... *G01M 7/027* (2013.01)

(58) Field of Classification Search
CPC .......... G01M 7/027; G01M 7/00; G01M 7/06; G01M 7/08
See application file for complete search history.

(56) References Cited

U.S. PATENT DOCUMENTS

| 4,528,842 A | 7/1985 | Brown |
| 5,289,354 A * | 2/1994 | Clayer .................... E21B 47/18 340/854.4 |
| 9,625,000 B2 * | 4/2017 | Hoffmann ............... F16F 13/00 |

FOREIGN PATENT DOCUMENTS

| CN | 101832873 A | 9/2010 |
| CN | 204556203 U | 8/2015 |

(Continued)

*Primary Examiner* — Suman K Nath
(74) *Attorney, Agent, or Firm* — Muncy, Geissler, Olds & Lowe, P.C.

(57) ABSTRACT

The present invention discloses a testing device and method for simulating longitudinal-transverse-torsional coupled nonlinear vibration of a drill string in deep-water riser-free drilling. The testing device comprises a pool (1), a motor (2) and a hook load adjustment device (3), wherein a guide wheel (4) is provided on the top of the pool (1); a support seat A (5) and a support seat B (6) are fixed on the bottom surface of the pool (1); an organic glass tube (8) is fixed between the support seat A (5) and the support seat B (6); a casing (9) is respectively provided on the top surface of the support seat B (6) and the top surface of the trailer (7); the left end of the plastic tube (10) extends into the organic glass tube (8) along the axis of the organic glass tube (8). The present invention further discloses a simulation method. The present invention has the following beneficial effects: the structure is compact; the longitudinal-transverse-torsion (Continued)

coupled vibration responses of the drill string under different rotating speeds of the drill string, ocean flow rates, flow rates of the drilling fluid, torsional excitations and longitudinal excitations at the bottom of the formation section is simulated, thereby filling up the blank in the riser-free drilling system.

8 Claims, 3 Drawing Sheets

(56) References Cited

FOREIGN PATENT DOCUMENTS

| | | | |
|---|---|---|---|
| CN | 105136598 | A | 12/2015 |
| CN | 204827421 | U | 12/2015 |
| CN | 105390060 | A | 3/2016 |
| CN | 105973551 | A | 9/2016 |
| CN | 106840627 | A | 6/2017 |
| CN | 207231980 | U | 4/2018 |
| CN | 108319754 | A | 7/2018 |
| CN | 108894776 | A | 11/2018 |
| CN | 108956118 | A | 12/2018 |
| CN | 109632223 | A | 4/2019 |

* cited by examiner

TEST DEVICE FOR SIMULATING LONGITUDINAL-LATERAL-TORSIONAL COUPLED NONLINEAR VIBRATION OF DRILL STRING OF DEEPWATER RISERLESS DRILLING AND METHOD THEREFOR

TECHNICAL FIELD

The present invention relates to the technical field of mechanics simulation of drill strings in riser-free drilling, and more particularly to an testing device and method for simulating longitudinal-transverse-torsional coupled nonlinear vibration of a drill string in deep-water riser-free drilling.

BACKGROUND

The 18th National Congress of the Communist Party of China made the strategic deployment of "building a maritime power" and "innovation-driven development". The report of the 19th National Congress of the Communist Party of China once again put forward the plan of "speeding up the building of a maritime power". Offshore oil and gas exploration and development is an important part of this strategic measure. At present, the offshore oil and gas exploration and development in China is developing from conventional waters (a water depth of less than 500 m) to deep waters (a water depth of 500-1500 m) and ultra-deep waters (a water depth of greater than 1500 m). With the increase of water depths, a riser system in conventional drilling is becoming larger and larger, the requirements for the carrying capacity of a platform and mooring system are increasing, and meanwhile, the problems of an excessively narrow formation pressure window and an excessively large usage amount of a casing are becoming more and more prominent.

The problem of longitudinal and horizontal coupled vibration of a marine riser in the riser system in conventional drilling has gradually attracted attention, and the main reasons are as follows: on the one hand, wave forces act on the platform, causing a platform's heave motion (also called parametric excitation), so that the axial tension of the riser changes with time; on the other hand, when the ocean current flows around the riser, the vortex shedding will occur to generate a vortex exciting force on the riser, such that the riser undergoes a transverse motion due to a periodic vortex exciting force and an ocean current force (also known as forced excitation), resulting in continuous fluctuations in axial tension, which is equivalent to periodic changes in the longitudinal stiffness of the system. Under the action of the above two mechanisms, the tension and natural vibration frequency in the riser fluctuate periodically. When this change meets certain conditions, the parametric resonance of the riser will be excited, and a large transverse vibration will occur in a short time, thereby causing a damage in the riser owing to extreme stress or significant fatigue, resulting in rupture and leakage, and significant economic loss and environmental pollution.

Because a riser system for conventional marine drilling is discarded and a dual-gradient mud circulation system is adopted, riser-free drilling as a novel deep-water drilling technology can solve the above problems well, shorten the well construction period, save the drilling cost and improve the safety of drilling operations. On the basis of researches on the existing drill string dynamics and marine drilling tube string mechanics, a deep-water RDS (Radial Drilling System) full-well longitudinal-transverse-torsional coupled nonlinear vibration model which takes the combined effects of drill string-borehole wall contact and rock-bit interaction in a formation section, the platform movement in a seawater section, and a marine environmental load into consideration is established, the longitudinal-transverse-torsional coupled nonlinear vibration response characteristics, stability conditions and vortex-induced vibration behaviors of the drill string are analyzed, similar experiments to verify and revise theoretical models and results are carried out, a systematic longitudinal-transverse-torsional coupled vibration characteristics of a deep-water riser-free drill string is formed by discussing the theoretical results and in combination with the actual physical process, and the expected results will guide the structural design of deep-water RDS and the optimization of drilling parameters, enrich the theory of deep-water tube string mechanics, and have important academic and application values. However, there is no testing system to truly simulate the longitudinal-transverse-torsional coupled vibration responses of the drill string under different rotating speeds of the drill string, ocean flow rates, flow rates of drilling fluid, and torsional excitations and longitudinal excitations at the bottom of the formation section.

SUMMARY

Technical Problem

An object of the present invention is to overcome the defects of the prior art and provide a testing device and method for simulating a vibration response of a drill tube in a riser-free offshore drilling system.

Solution of the Problems

Technical Solution

The object of the present invention is achieved by the following technical solution: a testing device for simulating longitudinal-transverse-torsional coupled nonlinear vibration of a drill string in deep-water riser-free drilling, which comprises a pool, a motor and a hook load adjustment device, wherein a guide wheel is provided on the top of the pool; a support seat A, a support seat B and a trailer are provided on the bottom surface of the pool in sequence from left to right; the support seat A and the support seat B are fixed on the bottom surface of the pool; an organic glass tube is fixed between the support seat A and the support seat B; a casing is respectively provided on the top surface of the support seat B and the top surface of the trailer; a plastic tube passes through a space between the two casings; the left end of the plastic tube extends into the organic glass tube along the axis of the organic glass tube, and a vibration exciter is fixed on the left extension end; the right end of the plastic tube extends to the right and extends out of the right casing, and the right extension end is connected with an output shaft of the motor through a coupling; a steel wire rope is fixed on the right extension end of the plastic tube; the other end of the wire rope bypasses the guide wheel and is connected with a spring and a tension gauge in sequence, and the other end of the tension gauge is connected with the hook load adjustment device; a fluid outlet joint and a fluid inlet joint are provided on the left and right ends of the plastic tube respectively and are communicated with the plastic tube; a drilling fluid outlet tube is connected to the fluid outlet joint, and a recycling tank which is located outside the pool is connected to the other end of the drilling fluid outlet tube; a drilling fluid inlet tube is connected to the fluid inlet joint, and a flowmeter and a circulating pump are connected to the other end of the drilling fluid inlet tube in sequence; the testing device further comprises a three-way displacement sensor, a computer, a resistance strain gauge, a charge amplifier, a signal acquisition instrument and a plurality of strain foils; the three-way displacement sensor and the strain foils are provided on a cylindrical surface of the plastic tube in the support seat B and trailer section; the three-way displacement sensor is connected to the charge amplifier via a signal line A; the strain foils are connected to the resistance strain gauge through a signal line B; the resistance strain gauge and the charge amplifier are both connected to the signal acquisition instrument through wires; and the signal acquisition instrument is connected to an input interface of the computer through a wire.

The three-way displacement sensor consists of a longitudinal displacement sensor and a transverse displacement sensor.

The strain foils are arranged at uniform intervals in an axial direction of the plastic tube.

The plastic tube and the organic glass tube are both horizontally arranged.

The steel wire rope is bound on the plastic tube, and the steel wire rope bypasses the guide wheel from below.

The vibration exciter includes an axial vibration exciter and a torsional vibration exciter.

The trailer includes a guide rail, a trailer body, wheels, a pull rod, a platform and a support, wherein the guide rail is horizontally fixed at the bottom of the pool; a plurality of wheels is installed at the bottom of the trailer body and located inside the guide rail; the support is provided at the top of the trailer body; the platform is provided at the top of the support; the pull rod is welded to the trailer body; and the casings are welded to the platform.

A testing method for simulating longitudinal-transverse-torsional coupled nonlinear vibration of a drill string in deep-water riser-free drilling comprises the following steps:

S1: the circulating pump is turned on to pump a drilling fluid into the plastic tube through the flowmeter, the drilling fluid inlet tube, and the fluid inlet joint in sequence; the flowmeter monitors a flow rate of the drilling fluid; after the flow rate is stable, the three-way displacement sensor detects a transverse displacement and a longitudinal displacement of the plastic tube in an ocean section, and transmits a signal to the charge amplifier via the signal line A; the charge amplifier transmits the signal to the signal acquisition instrument; the signal acquisition instrument then transmits the signal to the computer; the computer stores data, and meanwhile the strain foils detect a stress of the plastic tube in the ocean section, and transmit the signal to the resistance strain gauge via the signal line B; the resistance strain gauge transmits the signal to the signal acquisition instrument, the signal acquisition instrument then transmits the signal to the computer, and the computer stores data;

S2. a rotating speed of the circulating pump is changed to change the flow rate of the drilling fluid; the step S1 is repeated to measure longitudinal displacements, transverse displacements and stress responses of the plastic tube in a seawater section under different flow rates of the drilling fluid, so as to simulate the drill string vibration caused by the flow of the drilling fluid;

S3: the circulating pump is turned off, and the hook load adjustment device is turned on; the hook load adjustment device outputs a simple harmonic load which is transmitted to the plastic tube through the tension gauge, the spring and the steel wire rope; the tension gauge monitors the magnitude of the load; after the load is stable, the three-way displacement sensor detects a transverse displacement and a longitudinal displacement of the plastic tube in the ocean section, and transmits a signal to the charge amplifier via the signal line A; the charge amplifier transmits the signal to the signal acquisition instrument; the signal acquisition instrument then transmits the signal to the computer; the computer stores the data, and meanwhile, the strain foils detect a stress of the plastic tube in the ocean section, and transmit the signal to the resistance strain gauge via the signal line B; the resistance strain gauge transmits the signal to the signal acquisition instrument, the signal acquisition instrument transmits the signal to the computer, and the computer stores data;

S4: the simple harmonic load output by the hook load adjustment device is changed; the step S3 is repeated to measure longitudinal displacements, transverse displacements and stress responses of the plastic tube in a seawater section under different simple harmonic loads of the plastic tube, so as to simulate the drill string vibration caused by the movement of the drilling platform;

S5: the vibration exciter is turned on; the vibration exciter applies a torsional excitation and a longitudinal excitation to the left end of the plastic tube; the three-way displacement sensor detects a transverse displacement and a longitudinal displacement of the plastic tube in the ocean section, and transmits a signal to the charge amplifier via the signal line A; the charge amplifier transmits the signal to the signal acquisition instrument, and the signal acquisition instrument then transmits the signal to the computer; the computer stores the data, and meanwhile the strain foils detect a stress of the plastic tube in the ocean section, and transmit the signal to the resistance strain gauge via the signal line B; the resistance strain gauge transmits the signal to the signal acquisition instrument, the signal acquisition instrument transmits the signal to the computer, and the computer stores data, thereby simulating the drill pipe vibration when a drill bit drills the seabed;

S6: the vibration exciter is turned off, and the trailer is dragged horizontally and reciprocally to the left or right to simulate the flow of seawater, such that the trailer drives the plastic tube to move; after the dragging speed is stable, the three-way displacement sensor detects a transverse displacement and a longitudinal displacement of the plastic tube in the ocean section, and transmits a signal to the charge amplifier via the signal line A; the charge amplifier transmits the signal to the signal acquisition instrument; the signal acquisition instrument then transmits the signal to the computer; the computer stores data, and meanwhile, the strain foils detect a stress of the plastic tube in the ocean section, and transmit the signal to the resistance strain gauge via the signal line B; the resistance strain gauge transmits the signal to the signal acquisition instrument, the signal acquisition instrument transmits the signal to the computer, and the computer stores data;

S7: the dragging speed of the trailer is changed; the step S6 is repeated to measure longitudinal displacements, transverse displacements and stress responses of the plastic tube in a seawater section under different dragging speeds of the trailer, so as to simulate the drill string vibration caused by different ocean current speeds;

S8: the trailer is not dragged and the motor is turned on; the motor drives the plastic tube to rotate around its axis; after the rotating speed is stable, the three-way displacement sensor detects a transverse displacement and a longitudinal displacement of the plastic tube in the ocean section, and transmits a signal to the charge amplifier via the signal line A; the charge amplifier transmits the signal to the signal acquisition instrument; the signal acquisition instrument then transmits the signal to the computer; the computer stores data, and meanwhile, the strain foils detect the stress of the plastic tube in the ocean section, and transmit the signal to the resistance strain gauge via the signal line B; the resistance strain gauge transmits the signal to the signal acquisition instrument, the signal acquisition instrument transmits the signal to the computer, and the computer stores data; and S9: an output rotating speed of the motor is changed; the step S8 is repeated to measure longitudinal displacements, transverse displacements and stress responses of the plastic tube in a seawater section under different rotating speeds, so as to simulate the drill string vibration caused by different rotating speeds.

BENEFICIAL EFFECTS OF THE INVENTION

Beneficial Effects

The present invention has the following advantages:

(1) by changing the simple harmonic load, the trailer speed, the rotating speed of the motor, the flow rate of the drilling fluid, and the torsional excitation and longitudinal excitation at the bottom of the formation section, the longitudinal displacement, transverse displacement and stress response of the plastic tube in the seawater section are measured, and the longitudinal-transverse-torsional coupled vibration responses of the drill string under different rotating speeds of the drill string, ocean flow rates, flow rates of the drilling fluid, torsional excitations and longitudinal excitations at the bottom of the formation section are simulated finally.

(2) Compared with the researches on drill string vibration in existing marine drilling, the testing device and the testing method of the present invention are mainly directed to the problems of dynamics response, stability and vortex-induced vibration of the drill string in the seawater section under a transverse vibration mode or a longitudinal and horizontal coupled vibration mode, establishes the RDS full-well longitudinal-transverse-torsional coupled nonlinear vibration mechanics model considering both the formation section and the seawater section, and discuss the coupled vibration characteristics, stability mechanism and vortex-induced vibration behaviors of the deep-water RDS.

(3) According to the testing device and the testing method of the present invention, a research method of combining numerical analysis, approximate analytical analysis, and longitudinal-transverse-torsional coupled vibration test analysis of the entire well section is adopted, which not only explores the local vibration characteristics of deep-water RDS vibration, but also analyzes the overall and general laws of the vibration, and reveals the complex longitudinal-transverse-torsional coupled vibration characteristics of deep-water RDS from different angles.

In drawings, the reference symbols represent the following components: 1—pool; 2—motor; 3—hook load adjustment device; 4—guide wheel; 5—support seat A; 6—support seat B; 7—trailer; 8—organic glass tube; 9—casing; 10—plastic tube; 11—vibration exciter; 12—steel wire rope; 13—spring; 14—tension gauge; 15—drilling fluid inlet tube; 16—flowmeter; 17—circulating pump; 18—three-way displacement sensor; 19—computer; 20—resistance strain gauge; 21—charge amplifier; 22—signal acquisition instrument; 23—strain foils; 24—signal line A; 25—signal line B; 26—recycling tank; 27—guide rail; 28—trailer body; 29—wheels; 30—pull rod; 31—platform; 32—support; 33—drilling fluid outlet tube.

EMBODIMENTS OF THE INVENTION

Detailed Description

The present invention will be further described below in conjunction with the accompanying drawings. The protection scope of the present invention is not limited to the followings:

as shown in FIGS. 1 to 5, a testing device for simulating longitudinal-transverse-torsional coupled nonlinear vibration of a drill string in deep-water riser-free drilling comprises a pool 1, a motor 2 and a hook load adjustment device 3. The pool 1 contains seawater. A guide wheel 4 is provided at the top of the pool 1. A support seat A5, a support seat B6 and a trailer 7 are provided on the bottom surface of the pool 1 in sequence from left to right. The support seat A5 and the support seat B6 are fixed on the bottom surface of the pool 1. An organic glass tube 8 is fixed between the support seat A5 and the support seat B6. The transparent organic glass tube is used to simulate a wellbore to facilitate observation of various vibration phenomena. A casing 9 is respectively provided on the top surface of the support seat B6 and the top surface of the trailer 7. A plastic tube 10 passes through a space between the two casings 9. The plastic tube 10 and the organic glass tube 8 are both arranged horizontally. The plastic tube 10 is used to simulate the drill string, so as to truly simulate the condition where the low-order vibration of the deep-water drill string is controlled by tension and the bending stiffness is little affected as much as possible. The left end of the plastic tube 10 extends into the organic glass tube 8 along the axis of the organic glass tube 8, and a vibration exciter 11 is fixed on the left extension end. The vibration exciter 11 includes an axial vibration exciter and a torsional vibration exciter. The vibration exciter is used to excite the vibration at the bottom of the drill string to simulate the external excitation borne by the lower drill string during the drilling process.

Figure 1:
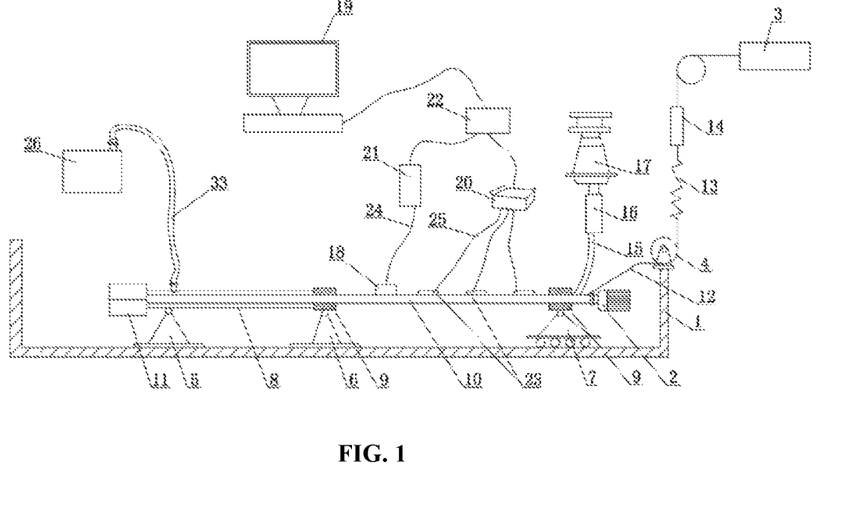
FIG. 1 is a structural schematic diagram of the present invention.
Figure 4:
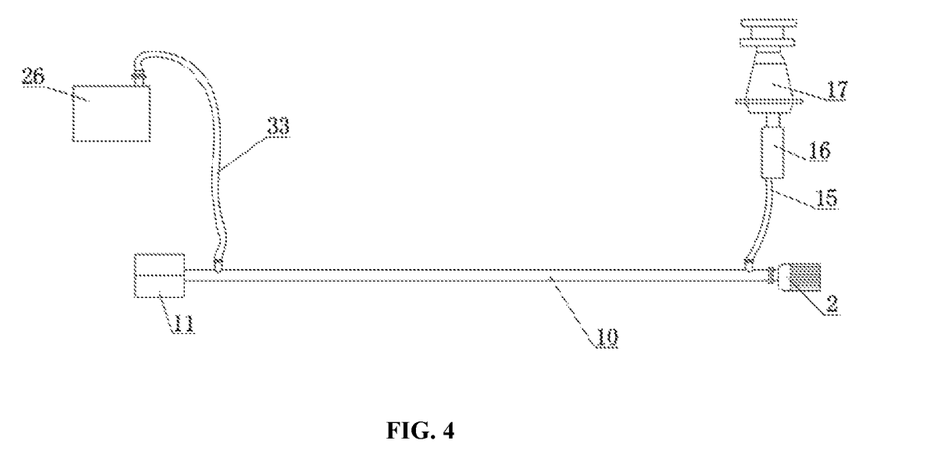
FIG. 4 is a schematic diagram of the installation of a circulating pump, a recycling tank and a plastic tube.

The right end of the plastic tube 10 extends to the right and extends out of the right casing 9, and the right extension end is connected with an output shaft of the motor 2 through a coupling. A steel wire rope 12 is fixed on the right extension end of the plastic tube 10. The other end of the steel wire rope 12 bypasses the guide wheel 4 and is connected with a spring 13 and a tension gauge 14 in sequence, and the other end of the tension gauge 14 is connected with the hook load adjustment device 3. A fluid outlet joint and a fluid inlet joint are provided on the left and right ends of the plastic tube 10 respectively and are communicated with the plastic tube 10. A drilling fluid outlet tube 33 is connected to the fluid outlet joint, and a recycling tank 26 which is located outside the pool 1 is connected to the other end of the drilling fluid outlet tube 33. A drilling fluid inlet tube 15 is connected to the fluid inlet joint, and a flowmeter 16 and a circulating pump 17 are connected to the other end of the drilling fluid inlet tube 15 in sequence.

Figure 5:
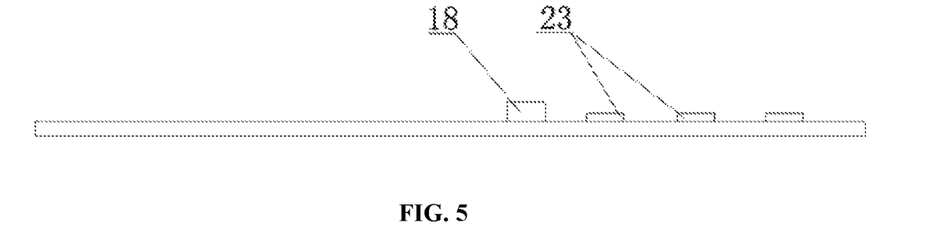
FIG. 5 is a schematic diagram of the installation of the plastic tube, a three-way displacement sensor and strain foils.

The testing device further comprises a three-way displacement sensor 18, a computer 19, a resistance strain gauge 20, a charge amplifier 21, a signal acquisition instrument 22 and a plurality of strain foils 23. The three-way displacement sensor 18 and the strain foils 23 are provided on a cylindrical surface of the plastic tube 10 in the support seat B6 and trailer 7 section; the strain foils 23 are arranged at uniform intervals in an axial direction of the plastic tube 10. The three-way displacement sensor 18 is connected to the charge amplifier 21 via a signal line A24. The strain foils 23 are connected to the resistance strain gauge 20 through a signal line B25. The resistance strain gauge 20 and the charge amplifier 21 are both connected to the signal acquisition instrument 22 through wires. The signal acquisition instrument 22 is connected to an input interface of the computer 19 through a wire.

Figure 3:
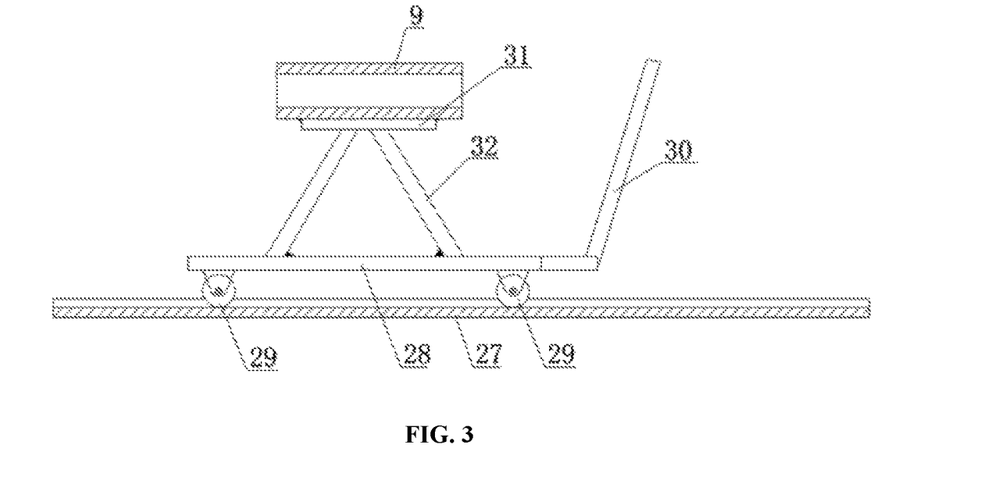
FIG. 3 is a structural schematic diagram of a trailer.

The three-way displacement sensor 18 consists of a longitudinal displacement sensor and a transverse displacement sensor. The steel wire rope 12 is bound on the plastic tube 10, and the steel wire rope 12 bypasses the guide wheel 4 from below. The trailer 7 includes a guide rail 27, a trailer body 28, wheels 29, a pull rod 30, a platform 31 and a support 32, wherein the guide rail 27 is horizontally fixed at the bottom of the pool 1. A plurality of wheels 29 is installed at the bottom of the trailer body 28 and located inside the guide rail 27. The support 32 is provided at the top of the trailer body 28. The platform 31 is provided at the top of the support 32. The pull rod 30 is welded to the trailer body 28. The trailer body 28 moves by dragging the pull rod 30. The casings 9 are welded to the platform 31.

Figure 2:
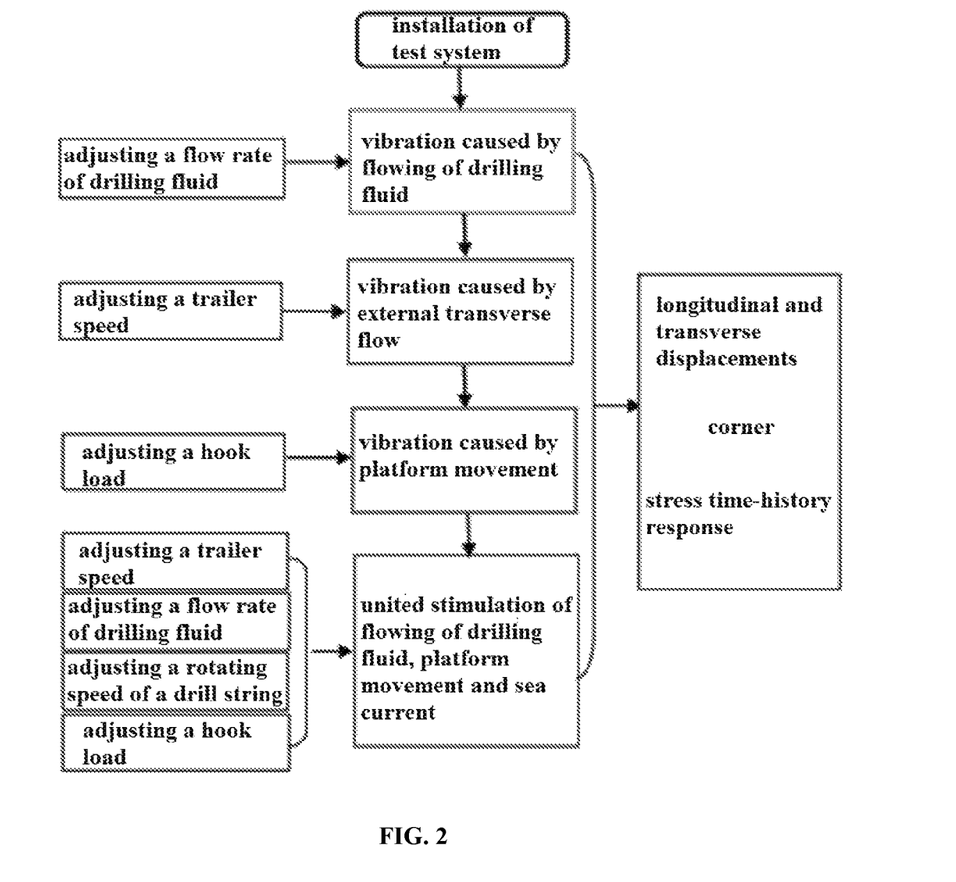
FIG. 2 is a flowchart of the present invention.

A testing method for simulating longitudinal-transverse-torsional coupled nonlinear vibration of a drill string in deep-water riser-free drilling comprises the following steps:

S1: the circulating pump 17 is turned on to pump a drilling fluid into the plastic tube 10 through the flowmeter 16, the drilling fluid inlet tube 15, and the fluid inlet joint in sequence; the drilling fluid flows axially along the plastic tube 10 under a pump pressure, and then enters the recycling tank 26 through the fluid outlet joint and the drilling fluid outlet tube 33; the flowmeter 16 monitors a flow rate of the drilling fluid; after the flow rate is stable, the three-way displacement sensor 18 detects a transverse displacement and a longitudinal displacement of the plastic tube 10 in an ocean section, and transmits a signal to the charge amplifier 21 via the signal line A24; the charge amplifier 21 transmits the signal to the signal acquisition instrument 22; the signal acquisition instrument 22 then transmits the signal to the computer 19; the computer stores data, and meanwhile the strain foils 23 detect a stress of the plastic tube 10 in the ocean section, and transmit the signal to the resistance strain gauge 20 via the signal line B25; the resistance strain gauge 20 transmits the signal to the signal acquisition instrument 22, the signal acquisition instrument 22 then transmits the signal to the computer 19, and the computer stores data;

S2. a rotating speed of the circulating pump 17 is changed to change the flow rate of the drilling fluid; the step S1 is repeated to measure longitudinal displacements, transverse displacements and stress responses of the plastic tube 10 in a seawater section under different flow rates of the drilling fluid, so as to simulate the drill string vibration caused by the flow of the drilling fluid;

S3: the circulating pump 17 is turned off, and the hook load adjustment device 3 is turned on; the hook load adjustment device 3 outputs a simple harmonic load which is transmitted to the plastic tube 10 through the tension gauge 14, the spring 13 and the steel wire rope 12; the tension gauge 14 monitors the magnitude of the load; after the load is stable, the three-way displacement sensor 18 detects a transverse displacement and a longitudinal displacement of the plastic tube 10 in the ocean section, and transmits a signal to the charge amplifier 21 via the signal line A24; the charge amplifier 21 transmits the signal to the signal acquisition instrument 22; the signal acquisition instrument 22 then transmits the signal to the computer 19; the computer stores data, and meanwhile, the strain foils 23 detect the stress of the plastic tube 10 in the ocean section, and transmit the signal to the resistance strain gauge 20 via the signal line B25; the resistance strain gauge 20 transmits the signal to the signal acquisition instrument 22, the signal acquisition instrument 22 then transmits the signal to the computer 19, and the computer stores data;

S4: the simple harmonic load output by the hook load adjustment device 3 is changed; the step S3 is repeated to measure longitudinal displacements, transverse displacements and stress responses of the plastic tube 10 in a seawater section under different simple harmonic loads of the plastic tube 10, so as to simulate the drill string vibration caused by the movement of the drilling platform;

S5: the vibration exciter 11 is turned on; the vibration exciter 11 applies a torsional excitation and a longitudinal excitation to the left end of the plastic tube 10; the three-way displacement sensor 18 detects a transverse displacement and a longitudinal displacement of the plastic tube 10 in the ocean section, and transmits a signal to the charge amplifier 21 via the signal line A24; the charge amplifier 21 transmits the signal to the signal acquisition instrument 22, and the signal acquisition instrument 22 then transmits the signal to the computer 19; the computer stores data, and meanwhile the strain foils 23 detect a stress of the plastic tube 10 in the ocean section, and transmit the signal to the resistance strain gauge 20 via the signal line B25; the resistance strain gauge 20 transmits the signal to the signal acquisition instrument 22, the signal acquisition instrument 22 then transmits the signal to the computer 19, and the computer stores data, thereby simulating the drill pipe vibration when a drill bit drills the seabed;

S6: the vibration exciter 11 is turned off, and the trailer 7 is dragged horizontally and reciprocally to the left or right to simulate the flow of seawater, such that the trailer drives the plastic tube 10 to move; after the dragging speed is stable, the three-way displacement sensor 18 detects a transverse displacement and a longitudinal displacement of the plastic tube 10 in the ocean section, and transmits a signal to the charge amplifier 21 via the signal line A24; the charge amplifier 21 transmits the signal to the signal acquisition instrument 22; the signal acquisition instrument 22 then transmits the signal to the computer 19; the computer stores data, and meanwhile, the strain foils 23 detect the stress of the plastic tube 10 in the ocean section, and transmit the signal to the resistance strain gauge 20 via the signal line B25; the resistance strain gauge 20 transmits the signal to the signal acquisition instrument 22, the signal acquisition instrument 22 then transmits the signal to the computer 19, and the computer stores data;

S7: the dragging speed of the trailer 7 is changed; the step S6 is repeated to measure longitudinal displacements, transverse displacements and stress responses of the plastic tube 10 in a seawater section under different dragging speeds of the trailer 7, so as to simulate the drill string vibration caused by different ocean current speeds;

S8: the drilling fluid inlet tube 15 and the drilling fluid outlet tube 33 are dismantled in the case that the trailer 7 is not dragged; the motor 2 is turned on; the motor 2 drives the plastic tube 10 to rotate around its axis; after the rotating speed is stable, the three-way displacement sensor 18 detects a transverse displacement and a longitudinal displacement of the plastic tube 10 in the ocean section, and transmits a signal to the charge amplifier 21 via the signal line A24; the charge amplifier 21 transmits the signal to the signal acquisition instrument 22; the signal acquisition instrument 22 then transmits the signal to the computer 19; the computer stores data, and meanwhile, the strain foils 23 detect the stress of the plastic tube 10 in the ocean section, and transmits the signal to the resistance strain gauge 20 via the signal line B25; the resistance strain gauge 20 transmits the signal to the signal acquisition instrument 22, the signal acquisition instrument 22 then transmits the signal to the computer 19, and the computer stores data; and S9: an output rotating speed of the motor 2 is changed; the step S8 is repeated to measure longitudinal displacements, transverse displacements and stress responses of the plastic tube 10 in a seawater section under different rotating speeds of the plastic tube 10, so as to simulate the drill pipe vibration caused by different rotating speeds.

By changing the simple harmonic load, the trailer speed, the rotating speed of the motor, the flow rate of the drilling fluid, and the torsional excitation and longitudinal excitation at the bottom of the formation section, the longitudinal displacement, transverse displacement and stress response of the plastic tube in the seawater section are measured, and the longitudinal-transverse-torsional coupled vibration response of the drill string under different rotating speeds of the drill string, ocean flow rates, the flow rates of the drilling fluid, torsional excitation and longitudinal excitation at the bottom of the formation section is simulated finally.

The above are only preferred embodiments of the present invention, and are not intended to limit the present invention in any form. Any person skilled in the art, without departing from the scope of the technical solution of the present invention, can make many possible changes and modifications to the technical solution of the present invention by using the above-mentioned technical content, or modify the preferred embodiments into equivalent embodiments of equal changes. Therefore, any amendments, equivalent changes, and modifications made to the above embodiments based on the technology of the present invention without departing from the content of the technical solution of the present invention belong to the protection scope of this technical solution.

The invention claimed is:

1. A testing device for simulating longitudinal-transverse-torsional coupled nonlinear vibration of a drill string in deep-water riser-free drilling, comprising: a pool, a motor and a hook load adjustment device, wherein a guide wheel is provided on the top of the pool; a support seat A, a support seat B and a trailer are provided on the bottom surface of the pool in sequence from left to right; the support seat A and the support seat B are fixed on the bottom surface of the pool; an organic glass tube is fixed between the support seat A and the support seat B; two casings are respectively provided on the top surface of the support seat B and the top surface of the trailer; a plastic tube passes through a space between the two casings; the left end of the plastic tube extends into the organic glass tube along the axis of the organic glass tube, and a vibration exciter is fixed on the left extension end; the right end of the plastic tube extends to the right and extends out of the casing on top surface of the trailer, and the right extension end is connected with an output shaft of the motor through a coupling; a steel wire rope is fixed on the right extension end of the plastic tube; the other end of the steel wire rope bypasses the guide wheel and is connected with a spring and a tension gauge in sequence, and the other end of the tension gauge is connected with the hook load adjustment device; a fluid outlet joint and a fluid inlet joint are provided on the left and right ends of the plastic tube respectively and are communicated with the plastic tube; a drilling fluid outlet tube is connected to the fluid outlet joint, and a recycling tank which is located outside the pool is connected to the other end of the drilling fluid outlet tube; a drilling fluid inlet tube is connected to the fluid inlet joint, and a flowmeter and a circulating pump are connected to the other end of the drilling fluid inlet tube in sequence; the testing device further comprises a three-way displacement sensor, a computer, a resistance strain gauge, a charge amplifier, a signal acquisition instrument and a plurality of strain foils; the three-way displacement sensor and the strain foils are provided on a cylindrical surface of the plastic tube in the support seat B and trailer section; the three-way displacement sensor is connected to the charge amplifier via a signal line A; the strain foils are connected to the resistance strain gauge through a signal line B; the resistance strain gauge and the charge amplifier are both connected to the signal acquisition instrument through wires; and the signal acquisition instrument is connected to an input interface of the computer through a wire.

2. The testing device for simulating longitudinal-transverse-torsional coupled nonlinear vibration of the drill string in deep-water riser-free drilling according to claim 1, wherein the three-way displacement sensor consists of a longitudinal displacement sensor and a transverse displacement sensor.

3. The testing device for simulating longitudinal-transverse-torsional coupled nonlinear vibration of the drill string in deep-water riser-free drilling according to claim 1, wherein the strain foils are arranged at uniform intervals in an axial direction of the plastic tube.

4. The testing device for simulating longitudinal-transverse-torsional coupling nonlinear vibration of the drill string in deep-water riser-free drilling according to claim 1, wherein the plastic tube and the organic glass tube are both horizontally arranged.

5. The testing device for simulating longitudinal-transverse-torsional coupling nonlinear vibration of the drill string in deep-water riser-free drilling according to claim 1, wherein the steel wire rope is bound on the plastic tube, and the steel wire rope bypasses the guide wheel from below.

6. The testing device for simulating longitudinal-transverse-torsional coupling nonlinear vibration of the drill string in deep-water riser-free drilling according to claim 1, wherein the vibration exciter includes an axial vibration exciter and a torsional vibration exciter.

7. The testing device for simulating longitudinal-transverse-torsional coupling nonlinear vibration of the drill string in deep-water riser-free drilling according to claim 1, wherein the trailer includes a guide rail, a trailer body, wheels, a pull rod, a platform and a support, wherein the guide rail is horizontally fixed at the bottom of the pool; a plurality of wheels are installed at the bottom of the trailer body and located inside the guide rail; the support is provided at the top of the trailer body; the platform is provided at the top of the support; the pull rod is welded to the trailer body; the casings are welded to the platform.

8. A testing method for simulating longitudinal-transverse-torsional coupled nonlinear vibration of a drill string in deep-water riser-free drilling, comprising the following steps:

S1: a circulating pump is turned on to pump a drilling fluid into a plastic tube through a flowmeter, a drilling fluid inlet tube, and a fluid inlet joint in sequence; the flowmeter monitors a flow rate of the drilling fluid; after the flow rate is stable, a three-way displacement sensor detects a transverse displacement and a longitudinal displacement of the plastic tube in an ocean section, and transmits a signal to a charge amplifier via a first signal line; the charge amplifier transmits the signal to a signal acquisition instrument; the signal acquisition instrument then transmits the signal to a computer; the computer stores data, and strain foils detect a stress of the plastic tube in the ocean section, and transmit the signal to the resistance strain gauge via a second signal line; the resistance strain gauge transmits the signal to the signal acquisition instrument, the signal acquisition instrument transmits the signal to the computer, and the computer stores data;

S2: a rotating speed of the circulating pump is changed to change the flow rate of the drilling fluid; the step S1 is repeated to measure longitudinal displacements, transverse displacements and stress responses of the plastic tube in a seawater section under different flow rates of the drilling fluid, so as to simulate the drill string vibration caused by the flow of the drilling fluid;

S3: the circulating pump is turned off, and a hook load adjustment device is turned on; the hook load adjustment device outputs a simple harmonic load which is transmitted to the plastic tube through a tension gauge, a spring and a steel wire rope; the tension gauge monitors the magnitude of the load; after the load is stable, the three-way displacement sensor detects a transverse displacement and a longitudinal displacement of the plastic tube in the ocean section, and transmits a signal to the charge amplifier via the first signal line; the charge amplifier transmits the signal to the signal acquisition instrument; the signal acquisition instrument then transmits the signal to the computer; the computer stores data, and meanwhile, the strain foils detect the stress of the plastic tube in the ocean section, and transmits the signal to the resistance strain gauge via the second signal line; the resistance strain gauge transmits the signal to the signal acquisition instrument, the signal acquisition instrument then transmits the signal to the computer, and the computer stores data;

S4: the simple harmonic load output by the hook load adjustment device is changed; the step S3 is repeated to measure longitudinal displacements, transverse displacements and stress responses of the plastic tube in the seawater section under different simple harmonic loads of the plastic tube, so as to simulate the drill string vibration caused by the movement of the drilling platform;

S5: a vibration exciter is turned on; the vibration exciter applies a torsional excitation and a longitudinal excitation to the left end of the plastic tube; the three-way displacement sensor detects a transverse displacement and a longitudinal displacement of the plastic tube in the ocean section, and transmits a signal to the charge amplifier via the first signal line; the charge amplifier transmits the signal to the signal acquisition instrument, and the signal acquisition instrument then transmits a signal to the computer; the computer stores data, and meanwhile the strain foils detect a stress of the plastic tube in the ocean section, and transmit the signal to the resistance strain gauge via the second signal line; the resistance strain gauge transmits the signal to the signal acquisition instrument, the signal acquisition instrument then transmits the signal to the computer, and the computer stores data, thereby simulating the vibration of the drill pipe when a drill bit drills the seabed;

S6: the vibration exciter is turned off, and the trailer is dragged horizontally and reciprocally to the left or right to simulate the flow of seawater, such that the trailer drives the plastic tube to move; after the dragging speed is stable, the three-way displacement sensor detects a transverse displacement and a longitudinal displacement of the plastic tube in the ocean section, and transmits a signal to the charge amplifier (21) via the first signal line; the charge amplifier transmits the signal to the signal acquisition instrument; the signal acquisition instrument then transmits the signal to the computer; the computer stores data, and meanwhile, the strain foils detect the stress of the plastic tube in the ocean section, and transmit the signal to the resistance strain gauge via the second signal line; the resistance strain gauge transmits the signal to the signal acquisition instrument, the signal acquisition instrument then transmits the signal to the computer, and the computer stores data;

S7: the dragging speed of the trailer is changed; the step S6 is repeated to measure longitudinal displacements, transverse displacements and stress responses of the plastic tube in the seawater section under different dragging speeds of the trailer, so as to simulate the drill string vibration caused by different ocean current speeds;

S8: the trailer is not dragged and the motor is turned on; the motor drives the plastic tube to rotate around its axis; after the rotating speed is stable, the three-way displacement sensor detects a transverse displacement and a longitudinal displacement of the plastic tube in the ocean section, and transmits a signal to the charge amplifier via the first signal line; the charge amplifier transmits the signal to the signal acquisition instrument; the signal acquisition instrument then transmits the signal to the computer; the computer stores data, and meanwhile, the strain foils detect a stress of the plastic tube in the ocean section, and transmits the signal to the resistance strain gauge via the second signal line; the resistance strain gauge transmits the signal to the signal acquisition instrument, the signal acquisition instrument then transmits the signal to the computer, and the computer stores data; and S9: an output rotating speed of the motor is changed; the step S8 is repeated to measure longitudinal displacements, transverse displacements and stress responses of the plastic tube in the seawater section under different rotating speeds, so as to simulate the drill pipe vibration caused by different rotating speeds.

* * * * *